United States Patent
Gruening et al.

(10) Patent No.: US 9,762,142 B2
(45) Date of Patent: Sep. 12, 2017

(54) ELECTRIC POWER CONVERTER WITH A VOLTAGE CONTROLLER AND A CURRENT CONTROLLER

(71) Applicants: Horst Gruening, Chiyoda-ku (JP); Yasuhiko Hosokawa, Minato-ku (JP)

(72) Inventors: Horst Gruening, Chiyoda-ku (JP); Yasuhiko Hosokawa, Minato-ku (JP)

(73) Assignees: MITSUBISHI ELECTRIC CORPORATION, Tokyo (JP); TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 87 days.

(21) Appl. No.: 14/646,253

(22) PCT Filed: Nov. 21, 2012

(86) PCT No.: PCT/JP2012/080798
§ 371 (c)(1),
(2) Date: May 20, 2015

(87) PCT Pub. No.: WO2014/080537
PCT Pub. Date: May 30, 2014

(65) Prior Publication Data
US 2015/0318798 A1    Nov. 5, 2015

(51) Int. Cl.
*H02M 7/538* (2007.01)
*H02M 7/49* (2007.01)
*H02M 7/5387* (2007.01)
*H02M 7/483* (2007.01)

(52) U.S. Cl.
CPC ............ *H02M 7/49* (2013.01); *H02M 7/538* (2013.01); *H02M 7/53803* (2013.01);
(Continued)

(58) Field of Classification Search
CPC .................................................... H02M 7/538
(Continued)

(56) References Cited

U.S. PATENT DOCUMENTS 6,366,485 B1 * 4/2002 Fujisawa ............... G04C 10/00
363/127
2010/0118578 A1    5/2010 Dommaschk et al.
(Continued)

FOREIGN PATENT DOCUMENTS

EP      2 100 367 B1    9/2009
JP      2010-512134 A   4/2010
(Continued)

OTHER PUBLICATIONS

European Office Action dated Jul. 28, 2015 in Patent Application No. 12799334.3.
(Continued)

*Primary Examiner* — Jue Zhang
*Assistant Examiner* — Trinh Dang
(74) *Attorney, Agent, or Firm* — Oblon, McClelland, Maier & Neustadt, L.L.P.

(57) ABSTRACT

An electric power converter for converting AC to DC power or DC to AC power is disclosed. The converter includes a circuit for controlling the voltage and the circuit for controlling the current separately. The voltage is controlled by the switching modules and the up-side controller using the calculated target voltage. The current is controlled by the current controller using the calculated target current.

10 Claims, 9 Drawing Sheets

(52) U.S. Cl.
CPC ... *H02M 7/53806* (2013.01); *H02M 7/53871* (2013.01); *H02M 2007/4835* (2013.01)

(58) Field of Classification Search
USPC .......................................................... 363/132
See application file for complete search history.

(56) References Cited

U.S. PATENT DOCUMENTS

| | | | |
|---|---|---|---|
| 2012/0051107 A1* | 3/2012 | Choi | H02M 1/4208 363/126 |
| 2012/0212191 A1* | 8/2012 | Yuzurihara | H02M 3/1584 323/205 |

FOREIGN PATENT DOCUMENTS

| | | |
|---|---|---|
| JP | 2012-44839 A | 3/2012 |
| WO | 2008/067785 A1 | 6/2008 |
| WO | WO 2012/013248 A1 | 2/2012 |

OTHER PUBLICATIONS

Office Action dated Jul. 12, 2016 in Japanese Patent Application No. 2015-524963 (with partial English translation).
International Preliminary Report on Patentability and Written Opinion dated Jun. 4, 2015 in PCT/JP2012/080798 (English translation only).
International Search Report dated Sep. 13, 2013 in PCT/JP12/080798 dated Nov. 21, 2012.

\* cited by examiner

|     | t1 | t2 | t3 | t4 | t5 | t6 | t7 | t8 | t9 | t10 | t11 | t12 | t13 |
|-----|----|----|----|----|----|----|----|----|----|-----|-----|-----|-----|
| MP1 | 1  | 1  | 1  | 0  | 1  | 1  | 1  | 1  | 1  | 1   | 1   | 1   | 1   |
| MP2 | 1  | 1  | 0  | 0  | 0  | 1  | 1  | 1  | 1  | 1   | 1   | 1   | 1   |
| MP3 | 1  | 0  | 0  | 0  | 0  | 0  | 1  | 1  | 1  | 1   | 1   | 1   | 1   |
| MP4 | 0  | 0  | 0  | 0  | 0  | 0  | 0  | 1  | 1  | 1   | 1   | 1   | 0   |
| MP5 | 0  | 0  | 0  | 0  | 0  | 0  | 0  | 0  | 1  | 1   | 1   | 0   | 0   |
| MP6 | 0  | 0  | 0  | 0  | 0  | 0  | 0  | 0  | 0  | 1   | 0   | 0   | 0   |
| MN1 | 1  | 1  | 1  | 1  | 1  | 1  | 1  | 1  | 1  | 0   | 1   | 1   | 1   |
| MN2 | 1  | 1  | 1  | 1  | 1  | 1  | 1  | 1  | 0  | 0   | 0   | 1   | 1   |
| MN3 | 1  | 1  | 1  | 1  | 1  | 1  | 1  | 0  | 0  | 0   | 0   | 0   | 1   |
| MN4 | 0  | 1  | 1  | 1  | 1  | 1  | 0  | 0  | 0  | 0   | 0   | 0   | 0   |
| MN5 | 0  | 0  | 1  | 1  | 1  | 0  | 0  | 0  | 0  | 0   | 0   | 0   | 0   |
| MN6 | 0  | 0  | 0  | 1  | 0  | 0  | 0  | 0  | 0  | 0   | 0   | 0   | 0   |

ELECTRIC POWER CONVERTER WITH A VOLTAGE CONTROLLER AND A CURRENT CONTROLLER

TECHNICAL FIELD

The present invention relates to an electric power converter and, more specifically, to an electric power converter which converts a DC power to an AC power, or which converts an AC power to a DC power.

BACKGROUND ART

An electric power converter is used for converting a DC power to an AC power, or for converting an AC power to a DC power. For example, a DC power is generated by a solar battery site assembled in a desert, and the DC power is converted to the AC power. In such a case, an electric power converter which converts a DC power to an AC power is used. In this case, the power converter produces a sinusoidal AC voltage and sinusoidal AC current from the output terminal. According to another example, an AC power is generated by an AC generator, and the AC power is converted to the DC power. In such a case, an electric power converter which converts an AC power to a DC power is used. In this case, the power converter produces a DC voltage and a DC current from the output terminal.

CITATION LIST

One example of the electric power converter is disclosed in EP 2100367 A1.

Patent Documents

1. EP 2100367 A1
2. JP 2010-512134 A1 (corresponding to document 1)
3. US 2010-0118578 A1 (corresponding to document 1)

The prior art power converter has the following problems to be solved.

The switching frequency of all sub-modules is low, for example below 200 Hz. Thus, the power conversion can not be carried out precisely.

Sub-module capacitors and phase-module inductors form a resonant circuit. It is not preferable to have a resonance current flowing in the converter.

Sub-module capacitors may be overcharged or undercharged during converter operation, resulting in unstable power conversion.

When sub-modules are switched to a new state, the sum of voltages in the capacitors may be changed before and after the switching. Such a switch to a new state produces step voltage. When the step voltage is introduced to the resonator, the step voltage may cause a new oscillation in addition to the oscillation occurred before. If the inductance of the inductor is small, the resonant frequency will be high. If the switching frequency of the sub-modules is 200 Hz, only a few switching moments can be included within a cycle of the resonator. This will result in the loss of control.

SUMMARY OF INVENTION

Solution to Problem

An object of the present invention is to provide an improved power converter which does not produce a circulating current.

Another object of the present invention is to produce an improved power converter which can control the voltage and the current separately.

According to one aspect of the present invention, an electric power converter which converts a DC power to an AC power and producing a sinusoidal AC voltage and sinusoidal AC current from an output terminal, comprises: a DC power source which produces a DC voltage between a first terminal and a second terminal; a reference voltage generator which generates a reference signal representing an AC voltage to which the DC power is to be converted; a voltage calculator which calculates, based on the reference signal, a target voltage to be produced between the first terminal and the output terminal; a voltage-side controller which controls the voltage between the first terminal and the output terminal to be equal to or nearly equal to the target voltage, whereby the voltage produced from the output terminal is a sinusoidal AC voltage; a current detector which detects a present current flowing through the output terminal; a current calculator which calculates, based on the target voltage and the present current, a target current to be flowing from the second terminal to the output terminal; and a current-side controller which controls the current flowing from the second terminal to the output terminal to be equal to or nearly equal to the target current, whereby the current flowing from the output terminal is a sinusoidal AC current.

According to another aspect of the present invention, An electric power converter which converts an AC power to a DC power and producing a DC voltage and a DC current between a first terminal and a second terminal, comprising: an AC power source which produces an AC voltage between an input terminal and a center terminal, said AC power source provided with an inductor and a breaker; a reference voltage generator which generates a reference signal representing an AC voltage which is synchronized with the AC voltage generated by the AC power source; a voltage calculator which calculates, based on the reference signal, a target voltage to be produced between the first terminal and the input terminal; a voltage-side controller which controls the voltage between the first terminal and the input terminal to be equal to or nearly equal to the target voltage, whereby the voltage produced between the first and second terminals is a DC voltage; a phase shifter which shifts a phase of the reference signal so that the AC voltage of the reference signal is phase shifted with the AC voltage generated by the AC power source; a current detector which detects a present current flowing through the input terminal; a current calculator which calculates, based on the target voltage and the present current, a target current to be flowing from the second terminal to the input terminal; and a current-side controller which controls the current flowing from the second terminal to the input terminal to be equal to or nearly equal to the target current, whereby the current flowing between the first and second terminals is a DC current.

Advantageous Effects of Invention

According to the present invention, since the voltage and the current are controlled separately, the current can be controlled to a desired value. Thus, the electric power converter does not produce any circulating current.

According to the present invention, since the voltage and the current are controlled separately, the current can be controlled at desired high rate of frequency which is different from the rate of frequency for controlling the voltage. Thus, the current can be controlled with high accuracy.

DESCRIPTION OF EMBODIMENTS

Embodiment 1

Figure 1:
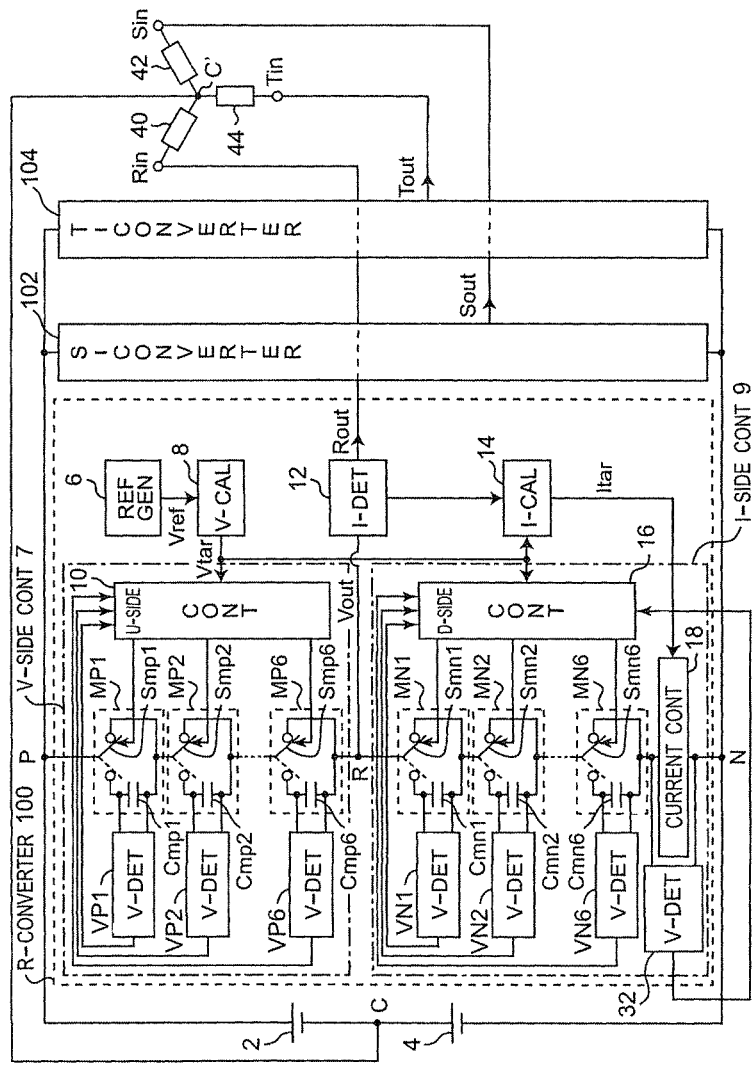
FIG. 1 is a circuit diagram of an electric power converter according to the first embodiment of the present invention, particularly showing a converter for converting a DC power to an AC power.

Referring to FIG. 1, an electric power converter for converting a DC power to an AC power, or converting an AC power to a DC power, according to the first embodiment of the invention is shown. According to the example shown in FIG. 1, the electric power converter converts DC power to AC power. The electric power converter includes DC power sources 2 and 4, such as solar cells, connected in series between junctions P and N to generate a constant voltage Vcon. Since operation of the electric power converter is explained with R phase in the following, DC power source 2 is assumed to produce the same amount of power as DC power source 4, and a Junction C between the DC power sources 2 and 4 at zero level is assumed to be created. The DC power from the DC power sources 2 and 4 is converted to 3-phase AC power by three phase converters, which are R-converter 100, S-converter 102 and T-converter 104 having the same structure, but the operation phase is shifted by 120 degrees to each other. R-converter 100, S-converter 102 and T-converter 104 are connected in parallel between junctions P and N and have outputs Rout, Sout and Tout, respectively for producing 3-phase AC power. Outputs Rout, Sout and Tout are connected to terminals Rin, Sin and Tin, respectively, and further to loads 40, 42 and 44, respectively. For the sake of explaining the R phase operation the loads 40, 42 and 44 are connected in the star connection with a center junction C' connected to the center junction C between the DC power sources 2 and 4.

The R-converter 100 has a plurality of, such as six, switching modules MP1, MP2, MP3, MP4, MP5 and MP6 (only MP1, MP2 and MP6 are shown for the sake of brevity) connected in series between junctions P and R, and a plurality of, such as six, switching modules MN1, MN2, MN3, MN4, MN5 and MN6 (only MN1, MN2 and MN6 are shown for the sake of brevity) connected in series between junctions N and R. The switching modules MP1-MP6 are provided in an up-side wing for controlling the voltage from a positive side potential Vp (a potential at junction P), and the switching modules MN1-MN6 are provided in a down-side wing to counterbalance the voltage produced in the switching modules MP1-MP6 in the up-side wing, by controlling the voltage from a negative side potential Vn (a potential at junction N). Junctions are also referred to as terminals. A current controller 18 is further connected in series to the six switching modules MN1, MN2, . . . MN6 between junctions R and N. The number of the switching modules MP1-MP6 is not limited to six, but can be any number, such as any number from 100 to 500. Similarly, the number of the switching modules MN1-MN6 can be any number, such as any number from 100 to 500.

Figure 2A:
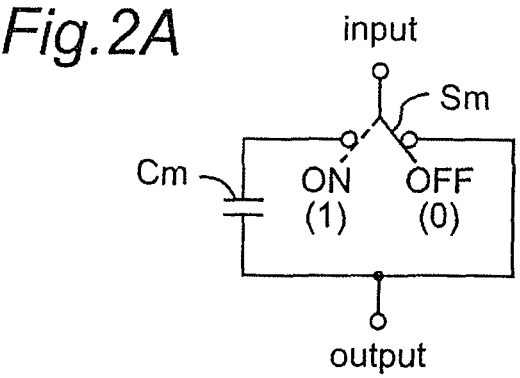
FIG. 2A is a circuit diagram showing an example of a switching module used in FIG. 1.

As shown in FIG. 2A, each switching module includes an input, an output, a capacitor Cm (corresponding to each of capacitors Cmp1-Cmp6, Cmn1-Cmn6 shown in FIG. 1, and such capacitors are generally indicated by Cm) and a switch Sm (corresponding to each of switches Smp1, Smp2, . . . , Smp6, Smn1, Smn2, . . . , Smn6 shown in FIG. 1, and such switches are generally indicated by Sm). When the switch Sm is ON represented by "1", the input and the output are connected through capacitor Cm. When switch Sm is OFF represented by "0", the input and the output are short circuited between the input and the output.

Figure 2B:
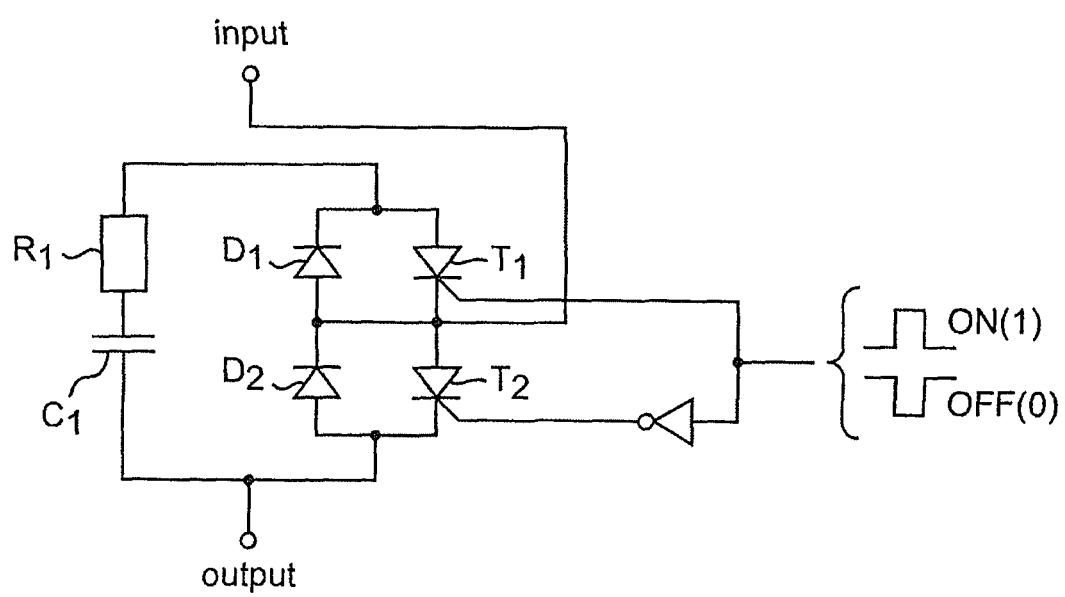
FIG. 2B is a circuit diagram showing a detail of the switching module shown in FIG. 2A.

Referring to FIG. 2B, an example of a circuit for forming a switching module is shown, which includes a series connection of a capacitor C1, a series connection of diodes D1 and D2 in a reverse direction, and a series connection of thyristors T1 and T2 in a forward direction. These three series connections are connected in parallel, and a junction between diodes D1 and D2 and a junction between thyristors T1 and T2 are also connected to each other. The input is connected to a junction between thyristors T1 and T2, and the output is connected to a junction between diode D2 and thyristor T2. The ON state shown in FIG. 2A corresponds to a case when thyristor T1 is turned on. In this case, a charging or discharging current flows through capacitor C1 from the input via diode D1 or thyristor T1, respectively to capacitor C1. The OFF state shown in FIG. 2A corresponds to a case when thyristor T2 is turned on. In this case, a forward or reverse short circuit is established by thyristor T2 or diode D2, respectively between the input and the output.

Figures 4A, 4B:
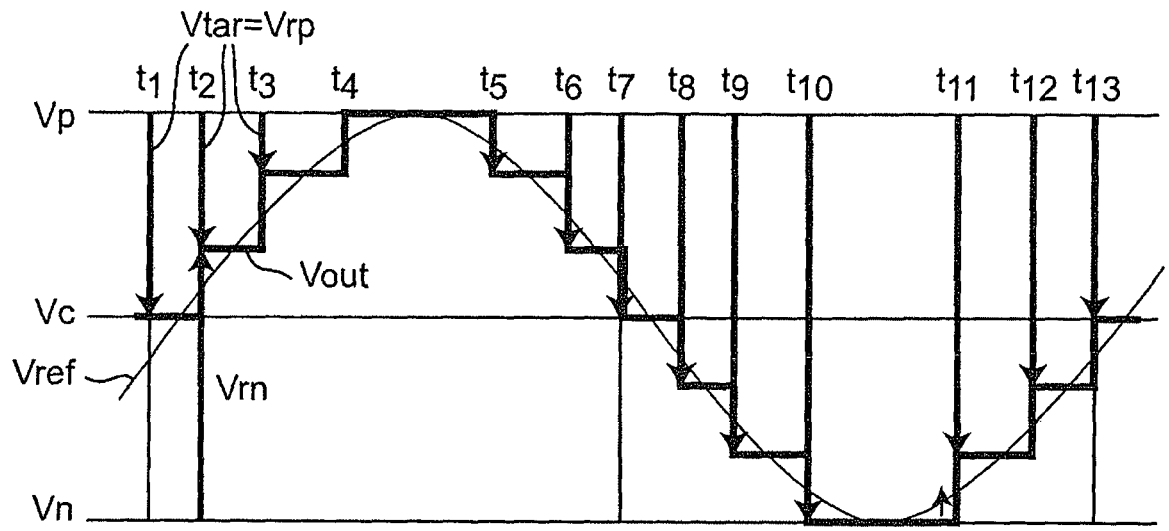
FIGS. 4A and 4B are a graph and a table, respectively, showing the operation of the switching modules and the up-side controller shown in FIG. 1.

Referring back to FIG. 1, the R-converter 100 further has voltage detectors VP1, VP2, . . . , VP6, VN1, VN2, . . . and VN6 connected to capacitors Cmp1, Cmp2, . . . , Cmp6, Cmn1, Cmn2, . . . , Cmn6 of switching modules MP1, MP2, . . . , MP6, MN1, MN2, . . . , MN6, respectively. The voltage detector VP1 is provided to detect the voltage across the capacitor Cmp1 in the corresponding switching module MP1, and so are the other voltage detectors. A voltage detector 32 is provided to detect the voltage across the current controller 18. An up-side controller 10 receives voltages across the capacitors Cmp1, Cmp2, . . . , Cmp6 in the switching modules in the up-side wing from the voltage detectors VP1, VP2, . . . , VP6. A down-side controller 16 receives voltages across the capacitors Cmn1, Cmn2, . . . , Cmn6 in the switching modules in the down-side wing from the voltage detectors VN1, VN2, . . . , and VN6. The down-side controller 16 also receives from the voltage detector 32 a voltage across the current controller 18, specifically across an inductor L1, which will be described later. The up-side controller 10 also receives a target voltage Vtar from a voltage calculator 8 which is connected, to a reference voltage generator 6. The voltage calculator 8 calculates a voltage to be subtracted from a voltage Vp at junction P, and such a voltage is referred to as the target voltage Vtar (FIG. 4A). The reference voltage generator 6 generates a reference signal representing a reference voltage Vref to which the DC power is to be converted. The down-side controller 16 also receives the target voltage Vtar from the voltage calculator 8.

A current detector 12 is inserted in an output line for detecting a current flowing through the output Rout. The current detected by the current detector 12 is applied to a current calculator 14 which also receives the target voltage Vtar from the voltage calculator 8. The output of the current calculator 14 produces a target current Itar which is applied to the current controller 18.

The reference voltage generator 6 generates a 60 Hz sinusoidal waveform Vref, such as shown in FIG. 4A. It is to be noted that the reference voltage Vref is the AC voltage to which the DC power is to be converted. The voltage calculator 8 calculates a target voltage Vtar which can be given by the following equation.

$$V\text{tar}=Vpc-k*V\text{ref} \quad (1)$$

wherein Vpc is a voltage between junctions P and C which is equal to the voltage across the DC power source 2, and k is a predetermined constant. The target voltage Vtar would be the amounts shown by arrows Vtar in FIG. 4A. As the sampling frequency increases, Vrp becomes more and more close to Vtar.

As apparent from equation (1), the target voltage Vtar is not proportional to the reference voltage Vref, but Vtar-Vpc is proportional to the reference voltage Vref. Thus, it can be said that the target voltage Vtar is biased by a predetermined voltage (Vpc), and such a biased target voltage is proportional to the reference voltage Vref. Thus, it is to be noted that the target voltage Vtar is in relation to the reference voltage Vref.

Figure 6A:
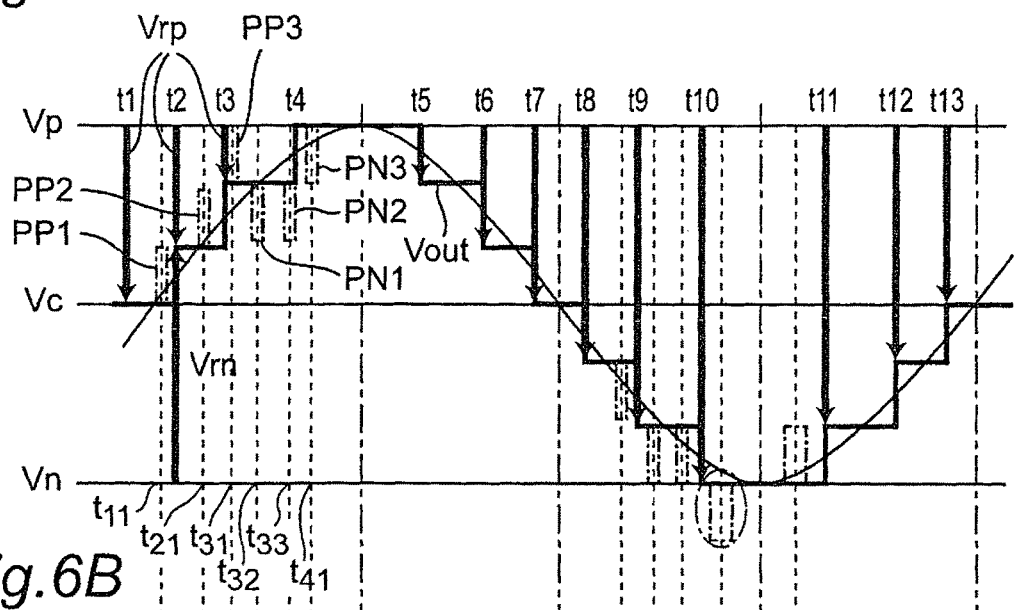
FIGS. 6A and 6B are graphs showing the operation of the switching modules and the down-side controller shown in FIG. 5.
Figure 6B:
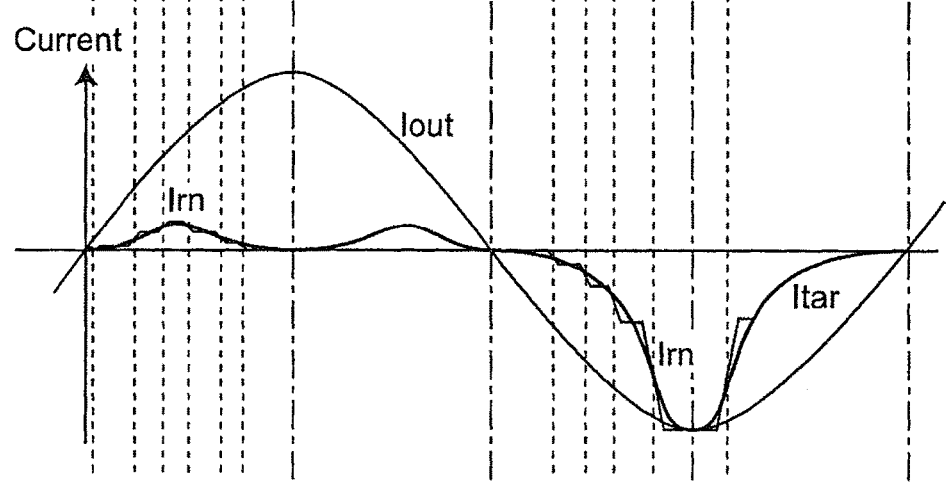

The current calculator 14 calculates a target current Itar which can be given by the following equation.

$$I\text{tar}=Irn=Iout(Vrp)/(2Vpc) \quad (2)$$

wherein Irn is a current flowing from junction R to junction N, Iout is a current flowing out from junction R which is detected by current detector 12, Vrp is the target voltage Vtar obtained by equation (1), and Vpc is a voltage between junctions P and C. An example of waveform of Itar is shown in FIG. 6B.

Equation (2) is obtained by the following steps.

$$Irp/Irn=Vrn/Vrp$$

wherein Irp is a current flowing from junction R to junction P, Irn is a current flowing from junction R to junction N, Vrn is a voltage between junctions R and N, and Vrp is a voltage between junctions R and P. It is noted that this equation is derived from the ideal 2-level converter—i.e. a 2-level converter operating at infinite switching frequency. A three phase converter, build of three such ideal 2-level converters, then, will provide the ideal transfer of energy from the three phase AC-system to the DC system or vice versa—i.e. it will provide undistorted 3-phase sine wave current to the AC system and constant DC current to the DC system.

Since $$Iout=Irp+Irn$$

we obtain $$Irn=Iout-Irp=Iout-Irn*(Vrn/Vrp).$$

Since $$Vrp+Vrn=Vpc+Vcn=2Vpc$$

we obtain $$Vrp=2Vpc-Vrn.$$

Thus, $$Irn=Iout-Irn\{Vrn/(2Vpc-Vrn)\}$$

$$Irn(1+\{Vrn/(2Vpc-Vrn)\})=Iout$$

$$Irn\{(2Vpc-Vrn)+Vrn\}/(2Vpc-Vrn)=Iout$$

$$Irn(2Vpc)/(2Vpc-Vrn)=Iout$$

$$Irn=Iout(2Vpc-Vrn)/(2Vpc).$$

Since $$2Vpc-Vrn=Vrp$$

we obtain $$Irn=Iout(Vrp)/(2Vpc).$$

The operation of the electric power converter of FIG. 1 is explained.

It is assumed that each of DC power sources 2 and 4 generates 3 k volts, thus, a voltage at a junction P is +3 k volts, and a voltage at a junction N is −3 k volts. Thus, a voltage across DC power sources 2 and 4 is 6 kV (=Vcon). Each capacitor Cm is charged to a minimal required value, such, as 1000 volts, but may be overcharged or undercharged. For example the charged voltage across capacitor Cm may vary, such as from 800 volts to 1200 volts, due to the current flowing through the capacitor Cm, the fluctuation of the DC power sources 2 and 4, the variation of the capacitors Cm, the change in the environmental condition, and others.

Referring to FIGS. 4A and 4B, at control time t1, switching modules MP1, MP2 and MP3 are turned ON (1), switching modules MP4, MP5 and MP6 are turned OFF (0), switching modules MN1, MN2 and MN3 are turned ON (1), and switching modules MN4, MN5 and MN6 are turned OFF (0). In this case, the potential +3 kV at junction P is decreased by a voltage in three capacitors Cmp1, Cmp2 and Cmp3 (each of capacitors Cmp1, Cmp2 and Cmp3 decreasing 1 kV) in three switching modules MP1, MP2 and MP3 so as to present zero volt at junction R, and at the same time, the potential −3 kV at junction N is increased by a voltage in three capacitors Cmn1, Cmn2 and Cmn3 (each of capacitors Cmn1, Cmn2 and Cmn3 increasing 1 kV) in three switching modules MN1, MN2 and MN3 so as to present zero volt at junction R. Thus, the voltage between junctions P and R, which is in this case +3 kV, is counterbalanced with the voltage between junctions R and N, which is in this case +3 kV. Here, the counterbalance means that the voltage produced in the up-side wing MP1-MP6 plus the voltage produced in the down-side wing MN1-MN6 is always equal to the voltage generated in the DC power sources 2 and 4.

At control time t2, switching modules MP1 and MP2 are turned ON (1), switching modules MP3, MP4, MP5 and MP6 are turned OFF (0), switching modules MN1, MN2, MN3 and MN4 are turned ON (1), and switching modules MN5 and MN6 are turned OFF (0). In this case, the potential +3 kV at junction P is decreased by a voltage in two capacitors in two switching modules MP1 and MP2 so as to present +1 kV at junction R, and at the same time, the potential −3 kV at junction N is increased by a voltage in four capacitors Cm in four switching modules MN1, MN2, MN3 and MN4 so as to present +1 kV at junction R.

Thereafter, for example, at control time t4, switching modules MP1, MP2, MP3, MP4, MP5 and MP6 are turned OFF (0), and switching modules MN1, MN2, MN3, MN4, MN5 and MN6 are turned ON (1). In this case, the potential +3 kV at junction P is directly applied to junction R, and the potential −3 kV at junction N is increased by a voltage in six capacitors Cm in six switching modules MN1-MN6 so as to present +3 kV at junction R.

Thus, the output voltage Vout at junction R changes in steps as shown in FIG. 4A. As the number of switching modules increases, and as the number of control time per a unit time increases, i.e., as the time interval between the control times becomes small, the output voltage Vout at junction R becomes more close to the target voltage Vtar.

In this manner, each of the switching modules MP1-MP6 and MN1-MN6 is controlled at a slow rate, such as 60 Hz.

In this manner, the up-side controller 10 controls the output voltage Vout at junction R, by decreasing the potential at junction P, i.e., the positive side voltage of the positive DC voltage Vpc (equal to the voltage across the DC power source 2). Thus, the voltage Vrp will be equal to or nearly equal to the target voltage Vtar by ON and OFF control of switching modules MP1-MP6 which are controlled based on the calculated amount given by equation (1). In other words, the up-side controller 10 controls capacitors Cmp1-Cmp6 so that the output voltage Vout at junction R will be equal to or nearly equal to the reference voltage Vref.

Furthermore, the down-side controller 16 controls the switching modules MN1-MN6 so as to set up a voltage between junctions R and N which would counterbalance the voltage produced between junctions P and R in such a manner that the voltage Vpn between junctions P and N is always equal to the voltage Vcon generated by DC power sources 2 and 4. The voltage produced between junctions R and N is shown as voltage Vrn in FIG. 4A, and the voltage produced between junctions P and R is shown as voltage Vrp. Thus, $$Vrn+Vrp=Vcon.$$

In other words, the voltage Vrn produced across capacitors Cmn1-Cmn6 is counterbalanced with the voltage Vrp produced across capacitors Cmp1-Cmp6 so that the total voltage produced across capacitors Cmp1-Cmp6 and Cmn1-Cmn6 is always 6 kV, i.e., equal to the voltage Vcon produced across the DC power sources 2 and 4.

According to the embodiment of FIG. 1, it is possible to precisely control the output voltage Vout at junction R even when one or more capacitor Cm is overcharged or undercharged, as explained below.

For example, at time t2 in FIG. 4B, if the capacitor Cmp2 in switching module MP2 is changed from 1 kV to 900 kV by previous action, the up-side controller 10 monitors such a change by the voltage detector VP2. Then, the up-side controller 10 turns the switching module MP2 that has been ON (1), to OFF (0) and turns ON (1) a substitute switching module, such as MP5, which is selected from one of the remaining switching modules in the up-side wing that is not being turned ON (1), and that is producing a stable 1 kV from its capacitor Cm. In this manner, it is possible to use one or more substitute switching module, if one or more switching module that has to be turned ON is showing an inappropriate voltage in the capacitor charge.

In the case where all the switching modules in the up-side wing are turned ON, such as at time t10, it is not possible to provide a substitute switching module according to the arrangement shown in FIG. 1. To manage such a problem, it is possible to provide an additional switching module, such as MP7 (not shown), or more switching modules in the up-side wing. The same applies to the down-side wing.

In addition it is noted that with a typical high power converter having a high number n of modules such as n=100 or n=500, compensation of voltage change across capacitors Cmpx or Cmnx (x=1 to n) also is accomplished by switching a few additional modules to the ON or OFF position, respectively. For example with n=500 and a nominal voltage of 1 kV per capacitor then 200 modules will be switched to ON to achieve Vrp=200 kV. If, however, voltage of those capacitors deviates from the nominal value of 1 kV to result in 990V per capacitor, then those 200 modules in ON state will provide a total of 198 kV. Then 2 additional modules are switched to ON to add 2 kV to these 198 kV, and a total of Vrp=200 kV is achieved.

Figure 3A:
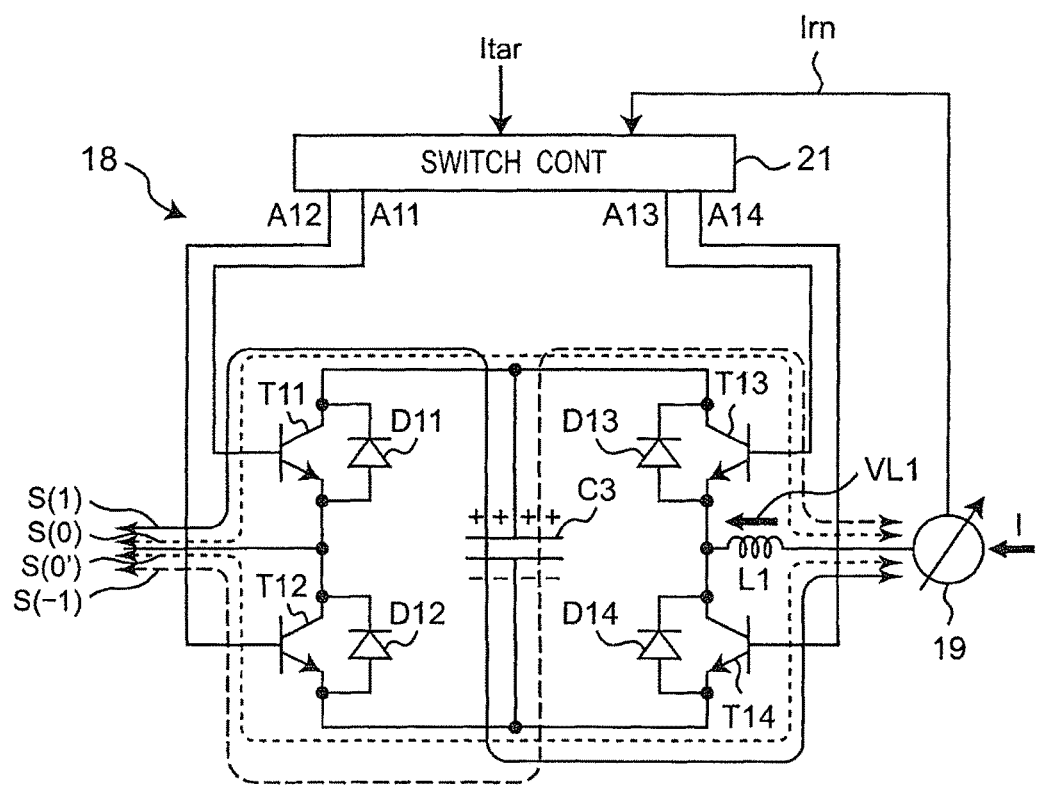
FIG. 3A is a circuit diagram showing a detail of a current controller shown in FIG. 1.
Figure 3B:
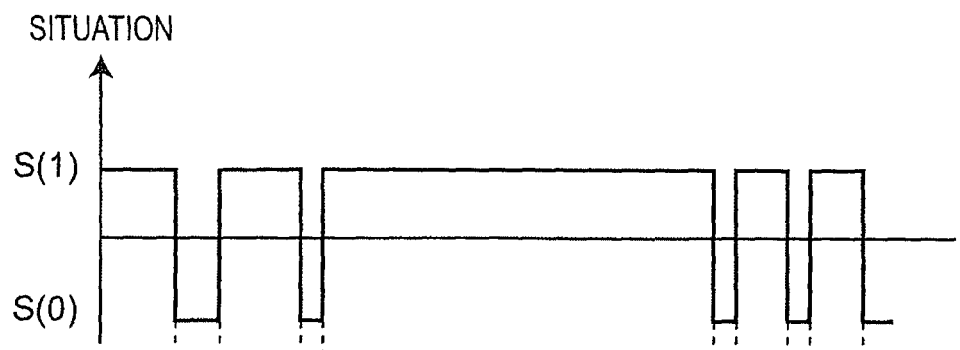
FIGS. 3B and 3C are graphs showing the operation of the current controller shown in FIG. 3A.

Referring to FIG. 3A, an example of the current controller 18 is shown. The current controller 18 has a full bridge circuit including transistors T11, T12, T13 and T14, and diodes D11, D12, D13 and D14 connected in reverse direction to transistors T11, T12, T13 and T14, respectively. A capacitor C3 is connected parallel to a series connection of transistors T13 and T14. An inductor L1 and a current detector 19, which are connected in series, are inserted in a main current flow line of the current controller 18. The current controller 18 further has a switch controller 21.

Switch controller 21 receives a signal representing a current Irn flowing between junctions R and N from current detector 19 and a target current value Itar from the current calculator 14. Switch controller 21 has four outputs A11, A12, A13 and A14 which are connected to transistors T11, T12, T13 and T14, respectively. Transistors T11, T12, T13 and T14 are turned ON and OFF in one of the four possible situations S(1), S(0), S(0') and S(-1), as shown in Table 1 below.

TABLE 1

| Situation | T11 | T12 | T13 | T14 |
|---|---|---|---|---|
| S(1) | ON | OFF | OFF | ON |
| S(0) | OFF | ON | OFF | ON |
| S(0') | ON | OFF | ON | OFF |
| S(−1) | OFF | ON | ON | OFF |

Under situation S(1), a current flows along a real line arrow in FIG. 3A. Under situation S(0), a current flows along an upper dotted line arrow. Under situation S(0'), a current flows along a lower dotted line arrow. Under situation S(-1), a current flows along a dash line. The situations S(1), S(0), S(0') and S(-1) are changed at a very high frequency, such as between 1 kHz and 5 kHz.

Figure 3C:
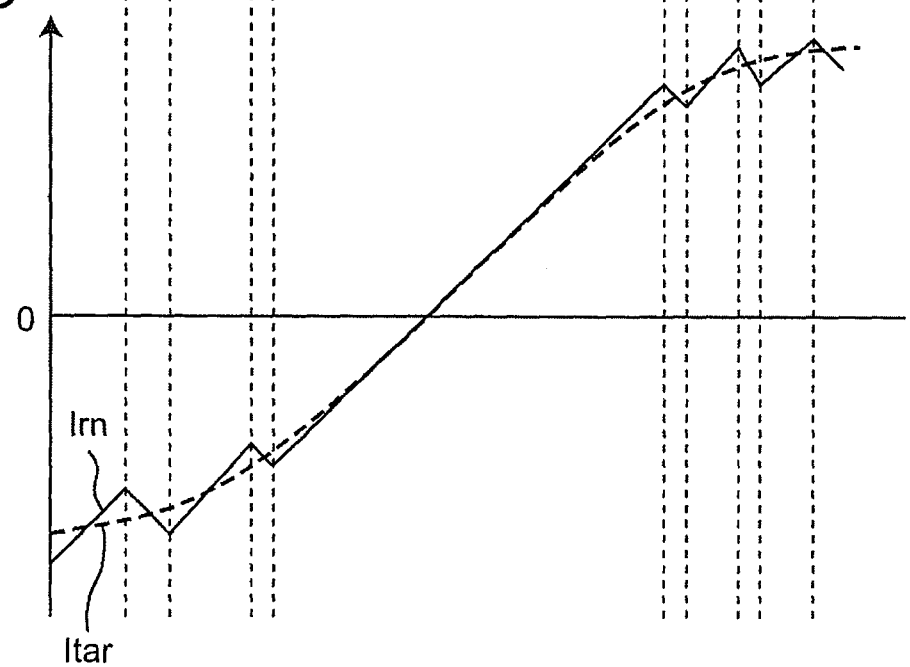

Referring to FIG. 3C, the target current Itar is an AC waving current, such as shown in FIG. 6B and obtained by equation (2).

The switch controller 21 compares the present current Irn between junctions R and N with the target current Itar. When Irn<Itar, the present current Irn should be increased to become close to the target current Itar. Thus, situation S(1) is established to increase the present current by the discharge of capacitor C3. When Irn>Itar, the present current Irn should be decreased to become close to the target current Itar. Thus, situation S(-1) is established to decrease the present current Irn by the charge of capacitor C3. When Irn=Itar, the present current should be maintained. Thus, situation S(0) or S(0') is established.

It is to be noted that both or one of situations S(0) and S(0') can be eliminated.

In this manner, each of transistors T11-T14 is controlled at a very high rate, such as at a frequency between 1 kHz and 5 kHz.

In this manner, the present current Irn varies up and down crossing the target current Itar, as shown in FIG. 3C.

By the current controller 18, the present current Irn flowing through the current controller 18, i.e., between junctions R and N will be equal to or nearly equal to the target current Itar.

In FIG. 1, the circuit connected to P and enclosed by a dot-dash line, including the switching modules MP1-MP6, voltage detectors VP1-VP6, and up-side controller 10, is used for controlling the voltage upon receipt of the target voltage Vtar. Thus, the circuit enclosed by the dot-dash line is referred to as a voltage-side controller 7.

Also, in FIG. 1, the circuit connected to N and enclosed by another dot-dash line, including the switching modules MN1-MN6, voltage detectors VN1-VN6, down-side controller 16 and current controller 18, is used for controlling the current upon receipt of the target current Itar. Thus, the circuit enclosed by another dot-dash line is referred to as a current-side controller 9.

According to the first embodiment of the invention, there is no inductor used in each of the switching modules MP1-MP6 and MN1-MN6. Thus, there will be no resonance current flowing through switching modules MP1-MP6 and MN1-MN6. If it should happen to produce a resonance current between the capacitor Cm in switching modules MN1-MN6 and the inductor L1 in the current controller 18, such a resonance current will be immediately suppressed by the current controller 18 which controls the current flowing therethrough to be equal to the target current Itar.

<Embodiment 2>

Figure 5:
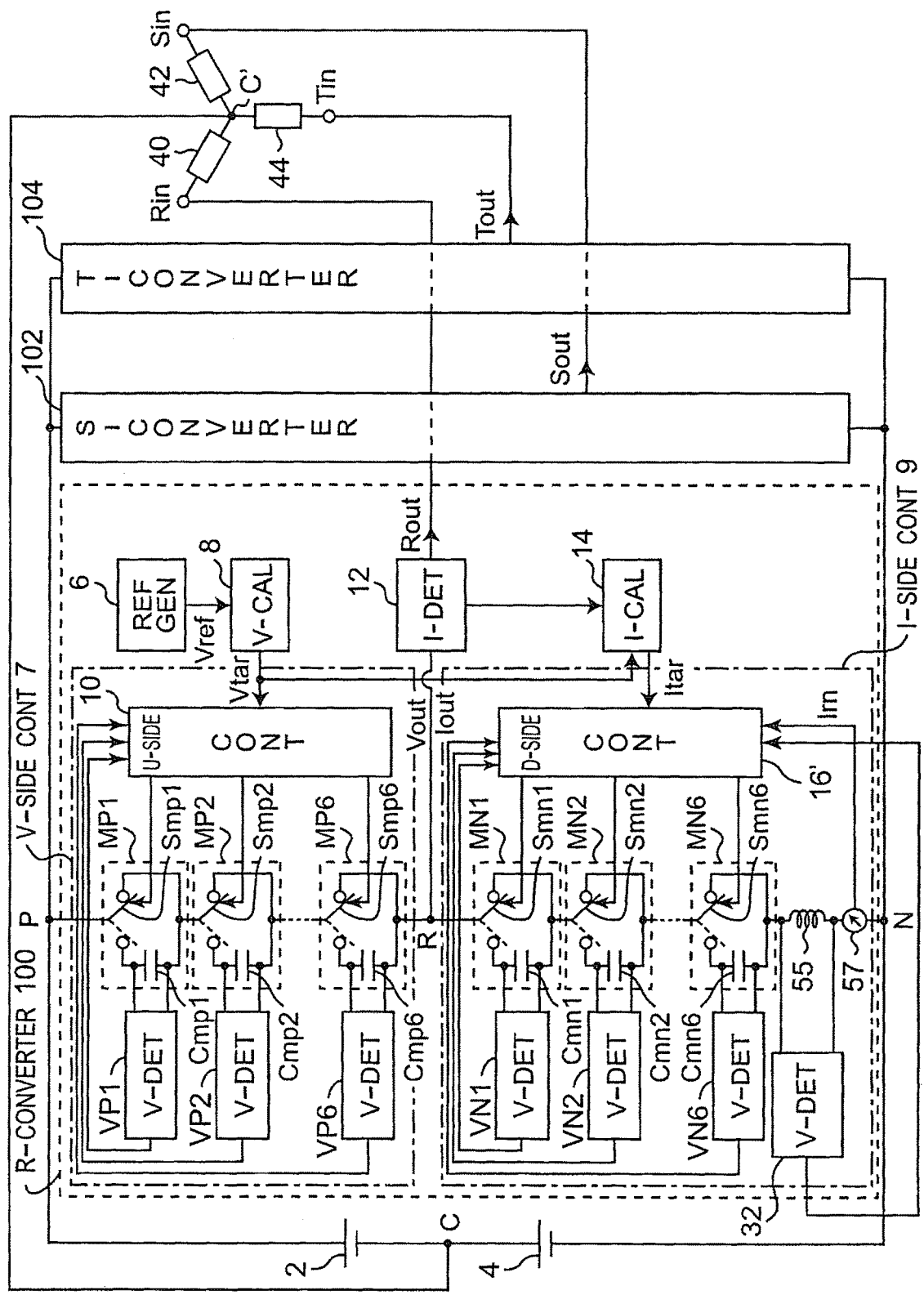
FIG. 5 is a circuit diagram of an electric power converter according to the second embodiment of the present invention, particularly showing a converter for converting an DC power to a AC power.

Referring to FIG. 5, an electric power converter according to the second embodiment of the invention is shown. The electric power converter shown in FIG. 5 differs from that shown in FIG. 1 in that the current controller 18 is replaced with inductor 55 and current detector 57, and the down-side controller 16 is replaced with down-side controller 16'. Other elements and structure of the electric power converter shown in FIG. 5 are the same as those shown in FIG. 1.

The operation of the electric power converter of FIG. 5 is explained. The up-side controller 10 of FIG. 5 operates in the same manner as that of FIG. 1. Thus, as shown in FIG. 6A, the output voltage Vout changes in steps, and the switching modules MP1-MP6 and MN1-MN6 changes as shown in FIG. 4B.

While the voltage is controlled by the up-side controller 10, the down-side controller 16' controls the current Iout flowing through the current detector 12 to be equal to or nearly equal to wave Itar, as shown in FIG. 6B. This is accomplished by down-side controller 16' such that the current Irn flowing through the current detector 57 is controlled to be equal to the target current Itar obtained by equation (2). As shown in FIG. 6B, the target current Itar obtained by equation (2) is not a sinusoidal curve, but is a waving curve which is obtained by multiplying sine and cosine. Down-side controller 16' compares the target current Itar and the present current Irn detected by current detector 57.

When the present current Irn is smaller than the target current Itar, the down-side controller 16' produces a single shot pulse to one of the switching modules MN1-MN6 which is in OFF (0) state. Thus, the switching module that receives the single shot pulse is turned ON instantaneously to produce a positive going pulse PP which induces the inductor 55 to increase the present current Irn flowing therethough.

On the other hand, when the present current Irn is greater than the target current Itar, the down-side controller 16' produces a single shot pulse to one of the switching modules MN1-MN6 which is in ON (1) state. Thus, the switching module that receives the single shot pulse is turned OFF instantaneously to produce a negative going pulse PN which induces the inductor 55 to decrease the present current Irn flowing therethough.

In this manner the current Irn is made equal to or nearly equal to the target current Itar. Such an instantaneous increase or decrease of the present current Irn is further explained below.

Referring to FIGS. 6A and 6B, at control time t11, it is detected that Irn<Itar. In this case, the present current Irn flowing between junction R and N should be increased. Thus the down-side controller 16' generates an on-pulse with a very short pulse duration, such as some tens or hundreds us (microseconds), and applies the on-pulse to one of switching modules MN1-MN6 which is in OFF (0) state, such as to switching module MN4. By the instantaneous turn ON of switching module MN4, one shot positive going pulse PP1 appears in inductor 55 to increase the current Irn. In a similar manner the positive going pulses PP2 and PP3 are generated at control times t21 and t31.

Then, for example, at control time t32, it is detected that Irn>Itar. In this case, the present current Irn flowing between junction R and N should be decreased. Thus the down-side controller 16' generates an off-pulse with a very short pulse duration, such as some tens or hundreds us, and applies the off-pulse to one of switching modules MN1-MN6 which is in ON (1) state, such as to switching module MN1. By the instantaneous turn OFF of switching module MN1, one shot negative going pulse PN1 appears in inductor 55 to decrease the current Irn. In a similar manner, the negative going pulses PN2 and PN3 are generated at control times t33 and t41, respectively.

In the above example, six switching modules MN1-MN6 are provided to control the present current Irn to be equal to the target current Itar, but it is preferable to provide one or more additional switching modules for the control of currents, as explained below.

For example, when all the switching modules MN1-MN6 are all in ON (1) state and if it is necessary to instantaneously turn ON another switching module, an additional switching module is necessary for producing the one shot positive going pulse PP. Similarly, when all the switching modules MN1-MN6 are all in OFF (0) state and if it is necessary to instantaneously turn OFF another switching module, an additional switching module is necessary for producing the one shot negative going pulse PP.

In this manner, the present current Irn becomes equal or nearly equal to the target current Itar without giving any influence to the output voltage Vout.

It is to be noted that average switching frequency of modules then can be, for example, any frequency between 180 Hz and 360 Hz.

<Embodiment 3>

Figure 7:
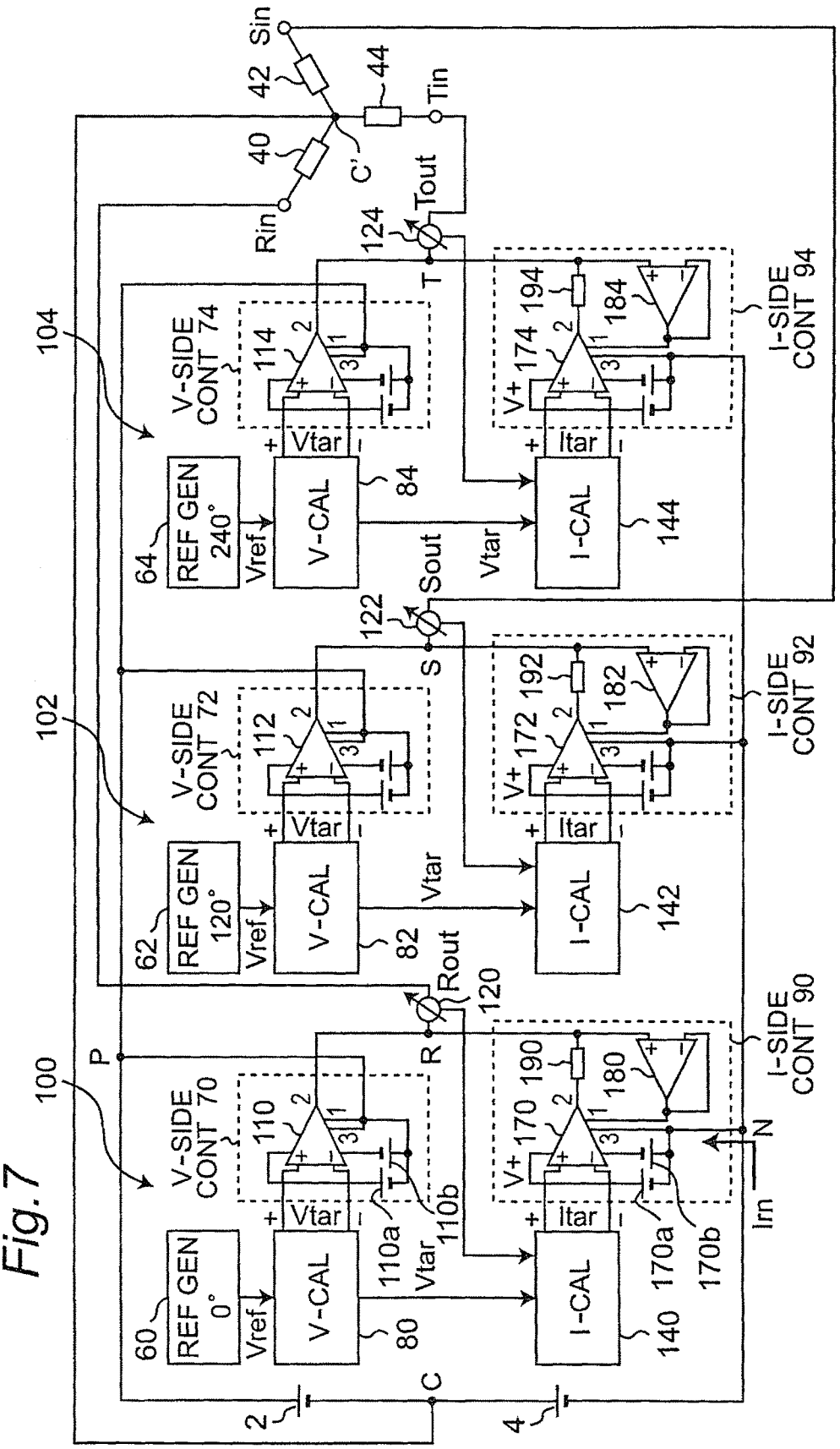
FIG. 7 is a circuit diagram of an electric power converter according to the third embodiment of the present invention, particularly showing a converter for converting an DC power to a AC power.

Referring to FIG. 7, an electric power converter according to the third embodiment of the invention is shown. The electric power converter shown in FIG. 7 includes R-converter 100, S-converter 102 and T-converter 104, having the same structure, but the operation phase is shifted by 120 degrees to each other.

The R-converter 100 has a reference voltage generator 60, a voltage calculator 80, a current detector 120 and a current calculator 140, which are basically the same as the reference voltage generator 6, voltage calculator 8, current detector 12 and current calculator 14 described above in connection with FIG. 1. The voltage calculator 80 calculates equation (1), and the current calculator 140 calculates equation (2). The R-converter 100 further has a voltage-side controller 70 and a current-side controller 90, which have similar function as voltage-side controller 7 and a current-side controller 9 described above in connection with FIG. 1.

The voltage-side controller 70 includes an instrumentational amplifier 110 provided with biasing voltage sources 110a and 110b. Terminals 1 and 3 of operational amplifier 110 is connected to junction P. Input terminals of instrumentational amplifier 110 receive a signal representing the target voltage Vtar, and the output terminal produces a controlled voltage to junction R. The controlled voltage is equal to the target voltage Vtar.

The current-side controller 90 includes an instrumentational amplifier 170, a feedback amplifier 180 and a resistor 190. Instrumentational amplifier 170 is provided with biasing voltage sources 170a and 170b. Terminal 3 of instrumentational amplifier 170 receives current Irn from junction N. Input terminals of instrumentational amplifier 170 receives a signal representing the target current Itar, and the output terminal produces a controlled current to junction R. The controlled current is equal to the target current Itar.

Similarly, S-converter 102 has a reference voltage generator 62, a voltage calculator 82, a current detector 122, a current calculator 142, a voltage-side controller 72 and a current-side controller 92. The voltage-side controller 72 includes an instrumentational amplifier 112, and the current-side controller 92 includes an instrumentational amplifier 172, a feedback amplifier 182 and a resistor 192.

Similarly, T-converter 104 has a reference voltage generator 64, a voltage calculator 84, a current detector 124, a current calculator 144, a voltage-side controller 74 and a current-side controller 94. The voltage-side controller 74 includes an instrumentational amplifier 114, and the current-side controller 94 includes an instrumentational amplifier 174, a feedback amplifier 184 and a resistor 194.

<Embodiment 4>

Figure 8:
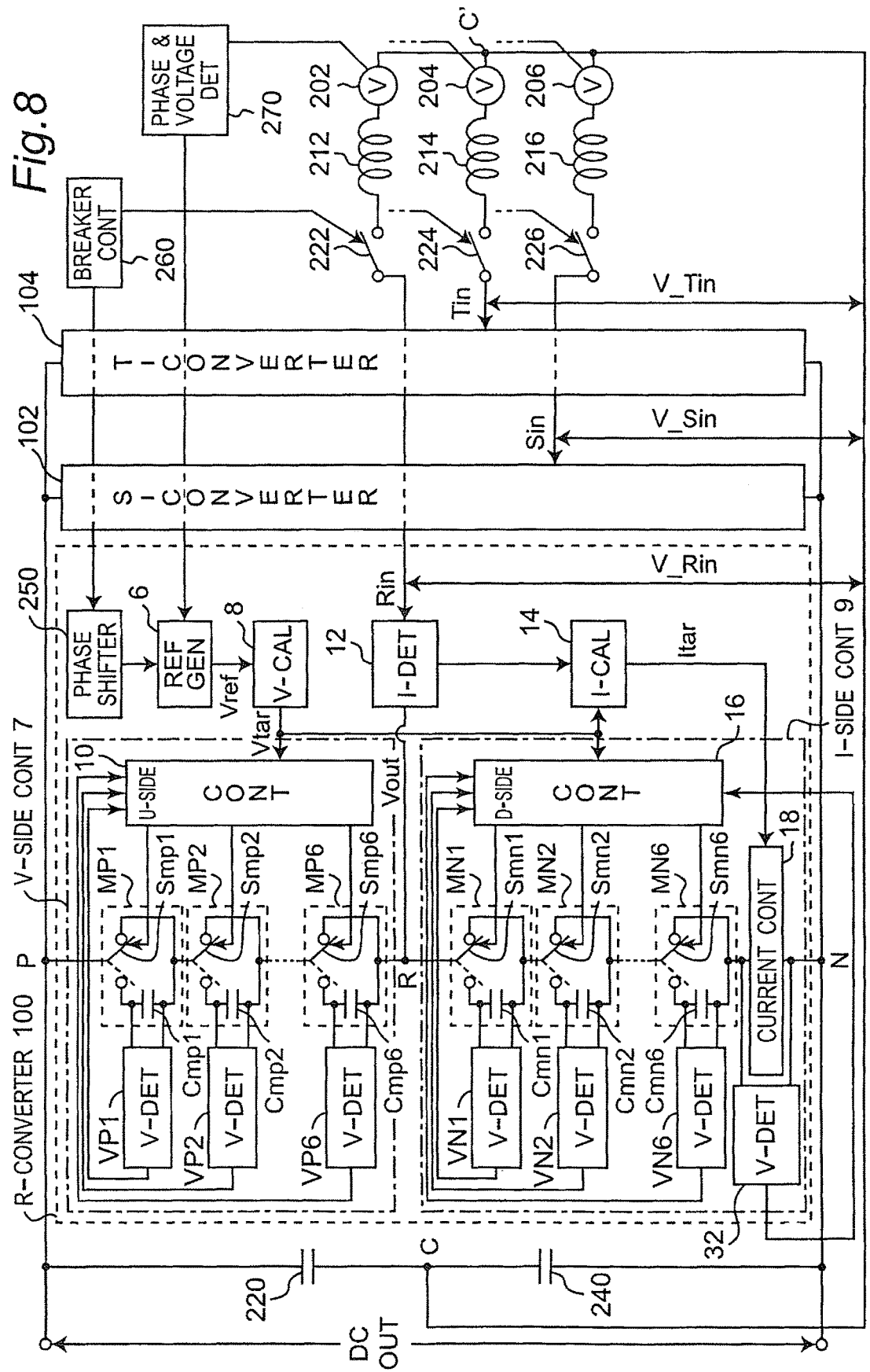
FIG. 8 is a circuit diagram of an electric power converter according to the fourth embodiment of the present invention, particularly showing a converter for converting an AC power to a DC power.

Referring to FIG. 8, an electric power converter for converting an AC power to DC power is shown. The electric power converter of FIG. 8 includes three-phase AC generators 202, 204 and 206 which are connected in a star connection having a center junction C'. AC generator 202 is connected to an inductor 212 and further to a breaker 222. The breaker 222 is connected to the R-converter 100, particularly to the current detector 12. In this embodiment, the junction R serves as an input terminal.

Similarly AC generator 204 is connected to an inductor 214 and further to a breaker 224. The breaker 224 is connected to the S-converter 102. Also, AC generator 206 is connected to an inductor 216 and further to a breaker 226. The breaker 226 is connected to the T-converter 104.

The AC generators 202, 204 and 206 generate AC voltages, with the phases being shifted by 120 degrees to each other. A phase and voltage detector 270 is coupled to the AC generator 202 for detecting the phase and voltage of the AC generator 202. The detected phase and voltage are applied to the reference voltage generator 6. A breaker controller 260 is provided for controlling the ON and OFF of breaker 222. The breaker controller 260 provides a control signal to a phase shifter 250 which is connected to the reference voltage generator 6.

Similarly, phase and voltage detectors (not shown) are coupled to AC generators 204 and 206, and breaker controllers (not shown) are provided for controlling the ON and OFF of breakers 224 and 226, respectively.

The DC power produced by R-converter 100, S-converter 102 and T-converter 104 is applied to capacitors 220 and 240 connected in series between junctions P and N. Junctions P and N also serves as DC output terminals.

The operation of R-phase is explained.

At first, breaker 222 is open, and generator 202 is generating an AC voltage. The phase and voltage detector 270 detects the phase and the voltage of the AC voltage generated by generator 202. Reference voltage generator 6, upon receipt of a signal representing the phase and the voltage of the AC voltage generated by generator 222, generates a sine wave reference voltage Vref which is synchronized with the AC voltage produced by the generator 202. At this time, capacitors 220 and 240 are fully charged, and capacitors Cmp1-Cmp6 and Cmn1-Cmn6 are fully charged to the minimal required value by a suitable charger (not shown). At this time, the voltage calculator 8 produces the target voltage Vtar, so that the AC voltage and the phase observed at junction R are the same as those generated by generator 202, and the voltage generated between junctions P and N is a constant DC voltage, but without any current at this instant.

Then, breaker 222 is closed by a control of the breaker controller 260. At this time, since the AC voltage and the phase thereof at generator 202 are the same as those observed at junction R, no current will flow between the junction R and the generator 202. In other words, the AC voltage at junction R is balanced with the AC voltage at generator 202, so that the current flowing through the current detector 12 is zero.

Then, after the breaker controller 260 turns the breaker 222 ON, the breaker controller 260 provides a phase shift signal to the phase shifter 250. Then, phase shifter 250 gradually shifts the phase of the sine wave reference voltage Vref. The phase may be shifted by 5 to 10 degrees. Thus, the AC voltage of the reference signal Vref is phase shifted with the AC voltage produced by the generator 222. When the phase shift occurs, the voltage at junction R will not be balanced with the voltage at generator 202, thus a sine wave voltage appears across inductor 212, and sine wave current flows through inductor 212. The current is detected by current detector 12. Then, the current calculator 14 calculates the target current that should flow through junction N. Then, the down-side controller 16 controls the switching modules MN1-MN6 so that the current flowing through junction N becomes a constant DC current. Thus, the AC power to DC power is converted. As the phase of the phase shifter 250 increases, the output DC current from junctions P and N increases.

Similar operations are carried out for S-phase and T-phase.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims.

INDUSTRIAL APPLICABILITY

The present invention can be used in a power converter.

DESCRIPTION OF THE REFERENCE SYMBOLS IN THE FIGURES

2 . . . power source
4 . . . power source
6, 60 . . . reference voltage generator
7, 70 . . . voltage side controller
8, 80 . . . voltage calculator
9, 90 . . . current side controller
10 . . . up-side controller
12 . . . current detector
14 . . . current calculator
16 . . . down side controller
18 . . . current controller
19, 57 . . . current detector
21 . . . switch controller
MP1-MP6, MN1-MN6 . . . switching module
VP1-VP6, VN1-VN6, 32 . . . voltage detector
40, 42, 44 . . . load
100 . . . R-converter
102 . . . S-converter
104 . . . T-converter
L1, 55 . . . inductor

The invention claimed is:

1. An electric power converter which converts a DC power to an AC power and produces a sinusoidal AC voltage and sinusoidal AC current from an output terminal, comprising:
   a reference voltage generator which generates a reference signal representing an AC voltage to which the DC power is to be converted;
   a voltage calculator which calculates, based on the reference signal, a target voltage;
   a voltage-side controller which controls a voltage between a first terminal and the output terminal to be equal to or nearly equal to the target voltage, whereby a voltage produced from the output terminal is a sinusoidal AC voltage;
   a current detector which detects a present current flowing through the output terminal;
   a current calculator which calculates, based on the target voltage and the present current, a target current to be flowing from a second terminal to the output terminal; and
   a current-side controller which controls the current flowing from the second terminal to the output terminal to be equal to or nearly equal to the target current,
   wherein said voltage calculator calculates the following equation:

$Vtar = Vpc - k*Vref$ wherein Vtar is the target voltage between the first terminal and the output terminal, Vpc is a voltage between the first terminal and a center terminal, which is a center of the DC power, Vref is a voltage of the reference signal, and k is a predetermined constant.

2. An electric power converter according to claim 1, wherein said current calculator calculates the following equation:

$Itar = Irn = Iout(Vrp)/(2Vpc)$ (2)

wherein Irn is the target current flowing from the output terminal to the second terminal, and Iout is a current detected by the current detector.

3. An electric power converter according to claim 1, wherein said voltage-side controller comprises: a first plurality of switching modules connected between said first terminal and said output terminal and each switching module having a capacitor for charging a predetermined voltage, wherein said first plurality of switching modules produces a voltage obtained by a series connection of capacitors; a first plurality of voltage detectors provided to said first plurality of switching modules, respectively, wherein each of said first plurality of voltage detectors detects a voltage across the corresponding capacitor; an up-side controller which compares the voltage obtained by the series connection of capacitors with the target voltage, and controls switching modules to set the voltage obtained by the series connection of capacitors so that the voltage at the output terminal is equal to or nearly equal to the target voltage.

4. An electric power converter according to claim 1, wherein said voltage-side controller comprises an operational amplifier.

5. An electric power converter according to claim 1, wherein said current-side controller comprises an operational amplifier.

6. An electric power converter according to claim 3, further comprising: a second plurality of switching modules connected between said second terminal and said output terminal and each switching module having a capacitor for charging a predetermined voltage, wherein said second plurality of switching modules produces a voltage obtained by a series connection of capacitors; a second plurality of voltage detectors provided to said second plurality of switching modules, respectively, wherein each of said second plurality of voltage detectors detects a voltage across the corresponding capacitor; an down-side controller which compares the voltage obtained by the series connection of capacitors with the target voltage, and controls switching modules to set the voltage obtained by the series connection of capacitors.

7. An electric power converter according to claim 6, wherein said current-side controller comprises:
   a current controller which controls the current at the second terminal, said current controller having an inductor;
   a current detector which detects a present current flowing through the second terminal; and
   a switching controller which compares the present current with the target current, and controls the current controller to control the current at the second terminal to be equal to or nearly equal to the target current.

8. An electric power converter according to claim 7, wherein said current controller comprises four transistors connected in a bridge circuit.

9. An electric power converter according to claim 7, wherein said current controller is formed by said second plurality of switching modules and wherein said switch controller is formed by said down-side controller.

10. An electric power converter which converts an AC power to a DC power and produces a DC voltage and a DC current between a first terminal and a second terminal, comprising:
    a reference voltage generator which generates a reference signal representing an AC voltage which is synchronized with the AC voltage generated by the AC power source;
    a voltage calculator which calculates, based on the reference signal, a target voltage;
    a voltage-side controller which controls a voltage between a first terminal and the input terminal to be equal to or nearly equal to the target voltage, whereby a voltage produced between the first and second terminals is a DC voltage;

a phase shifter which shifts a phase of the reference signal so that the AC voltage of the reference signal is phase shifted with the AC voltage generated by the AC power source;

a current detector which detects a present current flowing through the input terminal;

a current calculator which calculates, based on the target voltage and the present current, a target current to be flowing from a second terminal to the input terminal; and a current-side controller which controls the current flowing from the second terminal to the input terminal to be equal to or nearly equal to the target current, whereby the current flowing between the first and second terminals is a DC current, wherein said voltage calculator calculates the following equation:

$$Vtar = Vpc - k*Vref$$

wherein Vtar is the target voltage between the first terminal and the output terminal, Vpc is a voltage between the first terminal and a center terminal, which is a center of the DC power, Vref is a voltage of the reference signal, and k is a predetermined constant.

* * * * *